…

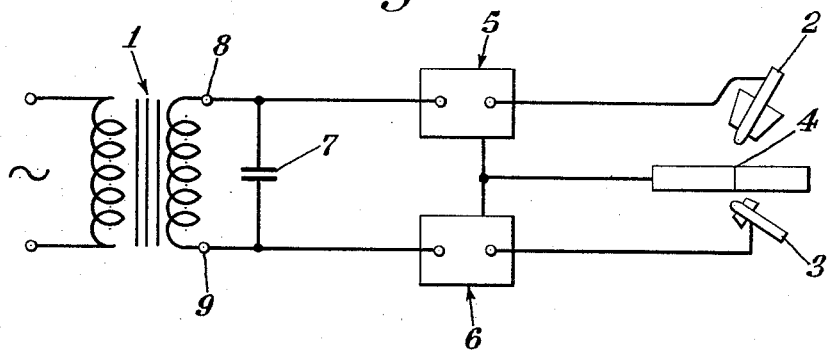
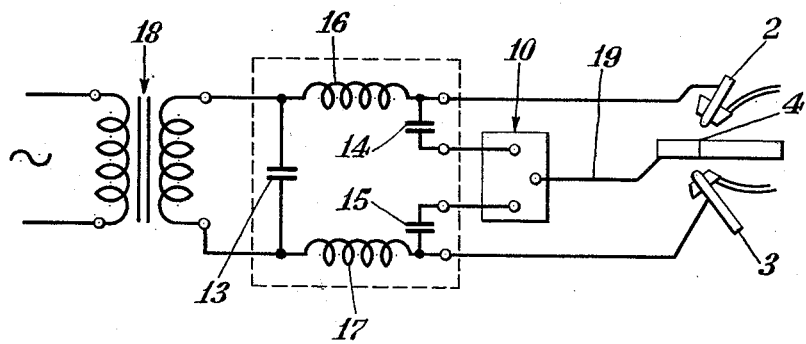

United States Patent Office 2,764,668
Patented Sept. 25, 1956

2,764,668

PROCESS FOR ELECTRIC ARC WELDING IN A PROTECTIVE ATMOSPHERE

Louis Dumoulin, Saint-Mande, France, assignor to L'Air Liquide, Societe Anonyme pour l'Etude et l'Exploitation des Procedes Georges Claude, Paris, France Application January 9, 1953, Serial No. 330,399

Claims priority, application France January 16, 1952

3 Claims. (Cl. 219—137)

The present invention relates to electric arc welding with alternating current in a shielding atmosphere particularly in inert gas, for example argon, and using a non-consumable electrode. It is known that in welding by a single pass, without filler metal, and without excessive fusion of the welding puddle, one is limited, especially in the case of aluminum, to thicknesses from two to three millimeters. For greater thicknesses it is preferable to make at least a second pass on the opposite side of the work. Moreover, in order to achieve acceptable stability of the welding arc in argon it is necessary to use a generator of welding current, generally a transformer having an open circuit voltage of at least 50 volts, the average arc voltage being between 15 and 20 volts, and to use, in addition, a generator of high-frequency current. Under these conditions the welding transformer works with a very poor power factor.

An object of the invention is a process of welding thick sheets of metals at a greater speed than with the usual processes.

Another object is to enable the welding with less inert gas consumption than with the conventional processes.

A further object is a welding process which permits the use of a welding transformer working with a better power factor than with the conventional processes.

According to a feature of the invention, these objects are obtained by a process of electric arc welding with alternating current and non consumable electrodes, which comprises utilizing two non consumable welding electrodes, connecting each of the electrodes respectively to one pole of a welding current source, establishing an arc between each electrode and a common workpiece, shielding the arcs with an atmosphere of inert gas, maintaining the electrodes in sufficiently close proximity to cause the welding puddles to join.

Preferably each of the electrodes is connected to a high-frequency generator which has, for example, its secondary winding in series with the welding circuit.

A considerable advantage is obtained in being able to use a single welding transformer having the same open-circuit voltage as is used for welding with a single electrode—a fact which practically doubles the power factor and practically suppresses the well-known and detrimental phenomenon of current rectification which is particularly important in the case of welding in an atmosphere of inert gas.

According to another characteristic of the invention, a transformer may be used having an open circuit voltage of the same order or even lower than that utilized in ordinary welding with a single electrode by connecting to the secondary terminals of the welding transformer a condenser of 2 to 40 microfarads. This remarkable result seems to be due to the formation of oscillations produced in the oscillator circuit formed by the winding of the transformer and the condenser in parallel, and that this oscillating circuit is less dampened than the circuits of this kind known for welding with a single arc. Namely, in the case of the two arcs in series, the resistance of the arcs in parallel with the oscillating circuit constituted by the transformer and the condenser is substantially twice that of a single arc. The interruption of welding current at the end of each alternation before the voltage at the terminals at the arc becomes zero produces in the oscillating circuit, which is concerned here, oscillations which may attain a very high amplitude of voltage and the frequency of which is a function of the characteristics of the oscillating circuit. The voltage peaks thus produced favor re-ignition of the arc. In this way stable arcs may be maintained with a welding transformer having an open circuit voltage of only 50 volts which, considered from the viewpoint of the power factor, is equivalent to feeding a single arc with a 25 volts open circuit current source. This property leads to an important advantage from the standpoint of efficiency of the welding transformer the power factor of which is at least double that of a station operating with a single arc.

Finally, since the rectified current is completely suppressed, the consumption of argon can be reduced to a value appreciably less than that in processes in which the rectified current is not negligible, a fact which together with the advantage of a greatly increased welding speed due to the piece being simultaneously heated at adjacent points leads to an important economy in the protective inert gas.

The accompanying drawing represents by way of example a circuit for carrying out the process according to the invention.

Figure 1 is a schematic representation of an arrangement according to the invention;

Figure 2 is a schematic view of a modification of the arrangement of Figure 1.

A welding transformer 1 of the usual type is connected to two electrodes 2 and 3 disposed on both sides of the seam 4 to be welded. Two high-frequency generators 5 and 6 are connected in series in the circuit of each of the electrodes in order to facilitate starting and stabilizing the welding arcs. A condenser 7 is connected between the terminals 8 and 9 of the secondary of the welding transformer. This condenser contributes to provide a protection of the welding transformer against the detrimental effects of high-frequency and at the same time to provide an oscillating circuit with the welding transformer. In this case its value is comprised between 2 and 40 microfarads and its presence improves the starting and the stabilization of the arc. It is thus possible to weld in a single pass by two simultaneous operations sheets of aluminum 5 millimeters thick without use of filler metal.

Preferably, one of the electrodes is maintained at a small distance behind the other, for instance a centimeter. Welding is preferably carried out upwardly along a vertical joint.

The principal advantages of this process are: a better cleaning of the edges and of the welding bead, and a better efficiency of the welding transformer the open circuit voltage of which is the same as when welding with a single arc, the arc voltage being about 30 volts and thus substantially twice the voltage of a single arc. Moreover, an almost complete suppression of the rectified component of the current is obtained without use of expensive condensers in series with the arc.

With filler metal, work pieces up to ten millimeters thick can be welded, which is very difficult if not impossible with a single arc without providing beveled edges of the workpieces along the seam.

According to the modification shown in Figure 2, a single high-frequency generator 10 is used having its terminals connected to the two electrodes through condensers 14 and 15 which prevent the welding current from passing across the winding of the high-frequency generator.

High frequency reactance coils 16 and 17 are connected in series between the high-frequency generator and the welding transformer 18 to prevent short-circuiting of the high-frequency by the condenser 13, which protects the welding transformer. Preferably the midpoint of the secondary of the high-frequency generator 10 is connected to the piece to be welded by the connection 19. This arrangement permits the use of a single high-frequency generator instead of two. It is generally necessary to use a high-frequency generator of slightly more power than that of the generators utilized in the case of a single arc. For instance it is possible to manually weld sheets of aluminum or light alloys. In particular, the welding of sheets of an alloy of aluminum and magnesium of the type AG5 containing 5 percent magnesium, and 12 millimeters in thickness with unbeveled edges, has been carried out with a 5 millimeter metal filler rod in uphill welding, the electrodes being on both sides of the piece, and displaced with a speed of 10 centimeters per minute. The current intensity used was 230 amperes R. M. S. and the total arc voltage was 35 volts, the welding transformer having an open circuit voltage of only 50 volts. The cleaning of the edges was very satisfactory with an argon consumption of 7 liters per minute for each welding electrode.

The process is also applicable with two electrodes disposed on the same side of the piece to be welded while maintaining the two electrodes sufficiently close to one another so that the molten metal of the welding puddles join and by advancing the two electrodes simultaneously at the same speed.

It has also been established that by using a transformer having an open circuit voltage of at least 100 volts use of high-frequency may be avoided once the welding arc has been started.

What I claim is:

1. In a gas-shielded arc welding method employing two electrodes respectively connected to two opposite polarity terminals of an alternating current welding source, said electrodes being maintained in arcing relation with a common workpiece to be welded having an electron emissivity substantially different from that of said electrodes at the welding temperature, the improvement which comprises employing a welding current source having approximately the same open-circuit voltage as would normally be used for a similar welding operation using only one electrode, and maintaining across said welding electrodes a capacitor having capacity sufficient to form with said welding current source an oscillatory circuit capable of producing strong voltage peaks, whereby arc re-ignition after each current alternation is greatly facilitated.

2. The arc welding method according to claim 1, in which the capacity of said capacitor maintained across said welding electrodes is in the range from approximately 2 to 40 microfarads.

3. In a gas-shielded arc welding method employing two electrodes respectively connected to two opposite polarity terminals of an alternating current welding source, said electrodes being maintained in arcing relation with a common workpiece to be welded so as to form a common weld puddle, said workpiece having an electron emissivity substantially different from that of said electrodes at the welding temperature, the improvement which comprises employing a welding current source having approximately the same open-circuit voltage as would normally be used for a similar welding operation using only one electrode, and maintaining across said welding electrodes a capacitor having capacity sufficient to form with said welding current source an oscillatory circuit capable of producing strong voltage peaks, whereby arc re-ignition after each current alternation is greatly facilitated.

References Cited in the file of this patent

UNITED STATES PATENTS

| | | |
|---|---|---|
| 1,091,479 | Bucknam | Mar. 31, 1914 |
| 1,979,944 | Kost | Nov. 6, 1934 |
| 2,173,450 | Larsen | Sept. 19, 1939 |
| 2,401,722 | Clapp et al. | June 11, 1946 |
| 2,472,323 | Welch | June 7, 1949 |
| 2,473,928 | White | June 21, 1949 |
| 2,536,294 | Landis et al. | Jan. 2, 1951 |
| 2,599,281 | Potter | June 3, 1952 |
| 2,655,586 | Schreiver et al. | Oct. 13, 1953 |

FOREIGN PATENTS

| | | |
|---|---|---|
| 442,766 | Italy | Nov. 30, 1948 |